United States Patent
Selig et al.

(10) Patent No.: US 12,459,749 B2
(45) Date of Patent: Nov. 4, 2025

(54) DEVICE FOR TRANSPORTING PIECE GOODS

(71) Applicant: Frenell IP GmbH, Karlsruhe (DE)

(72) Inventors: Martin Selig, Karlsruhe (DE); Max Mertins, Freiburg (DE)

(73) Assignee: Frenell IP GmbH (DE)

( * ) Notice: Subject to any disclaimer, the term of this patent is extended or adjusted under 35 U.S.C. 154(b) by 72 days.

(21) Appl. No.: 18/684,944

(22) PCT Filed: Aug. 12, 2022

(86) PCT No.: PCT/DE2022/100596
§ 371 (c)(1),
(2) Date: Feb. 20, 2024

(87) PCT Pub. No.: WO2023/025350
PCT Pub. Date: Mar. 2, 2023

(65) Prior Publication Data
US 2024/0343497 A1    Oct. 17, 2024

(30) Foreign Application Priority Data
Aug. 27, 2021 (DE) .................. 10 2021 122 268.0

(51) Int. Cl.
*B65G 1/14* (2006.01)
*B25H 3/04* (2006.01)
(Continued)

(52) U.S. Cl.
CPC .................. *B65G 35/00* (2013.01)

(58) Field of Classification Search
CPC .......... B65G 1/14; B65G 35/00; B65G 57/03; B25H 3/04; B65H 29/26
(Continued)

(56) References Cited

U.S. PATENT DOCUMENTS 4,192,121 A * 3/1980 Caudle .................. B65B 35/50
53/260
4,938,657 A * 7/1990 Benson .................. B65G 57/06
271/192
(Continued)

FOREIGN PATENT DOCUMENTS

CN    202072102    12/2011
CN    102814802    12/2012
(Continued)

*Primary Examiner* — Douglas A Hess
(74) *Attorney, Agent, or Firm* — Pandiscio & Pandiscio

(57) ABSTRACT

The problem to be solved by the invention is to provide a facility for supporting sensitive piece goods without having to manually assemble and disassemble auxiliary structures, which have to be returned to their place of origin after transportation. Such solutions are known from prior art but require a lot of time and work.
This problem is solved by a transport frame having a simple mechanism that does not require manual intervention. To this end, on both sides of a loading shaft, a plurality of supports stacked on one another are arranged in a transport container and, in an unfolded state, are in a release position so that the piece goods can be placed on a bottom support without being obstructed by the loading shaft. A loaded support presses the next higher support into a receiving position so that, without having to interact from outside, the piece goods can be loaded into the transport frame one after the other.

12 Claims, 1 Drawing Sheet

(51) Int. Cl.
    *B65G 35/00*         (2006.01)
    *B65G 57/03*         (2006.01)
    *B65H 29/26*        (2006.01)

(58) Field of Classification Search
    USPC .............................. 414/790.9, 793.4, 794.2
    See application file for complete search history.

(56)               References Cited

U.S. PATENT DOCUMENTS

| | | | |
|---|---|---|---|
| 6,647,616 B1 * | 11/2003 | Matsumura | H05K 13/021 |
| | | | 29/772 |
| 7,686,153 B2 * | 3/2010 | Tsai | B65G 57/10 |
| | | | 414/788.9 |
| 8,366,376 B2 * | 2/2013 | Herrmann | B65H 31/3063 |
| | | | 414/924 |
| 8,459,929 B2 * | 6/2013 | Pillard | B65H 1/06 |
| | | | 221/75 |
| 9,212,011 B2 * | 12/2015 | Matsumoto | B32B 5/26 |
| 9,221,628 B2 * | 12/2015 | Dax | B65H 33/16 |
| 10,053,264 B2 * | 8/2018 | Roos | B65B 35/50 |
| 2020/0231377 A1 | 7/2020 | Byström | |

FOREIGN PATENT DOCUMENTS

| | | |
|---|---|---|
| CN | 103921024 | 7/2014 |
| CN | 111559609 | 8/2020 |
| DE | 9302139 | 6/1993 |
| DE | 10152046 | 5/2003 |
| DE | 102005025813 | 12/2006 |
| DE | 102016103997 | 6/2017 |
| EP | 0808783 | 11/1997 |
| EP | 1270453 | 1/2003 |

* cited by examiner

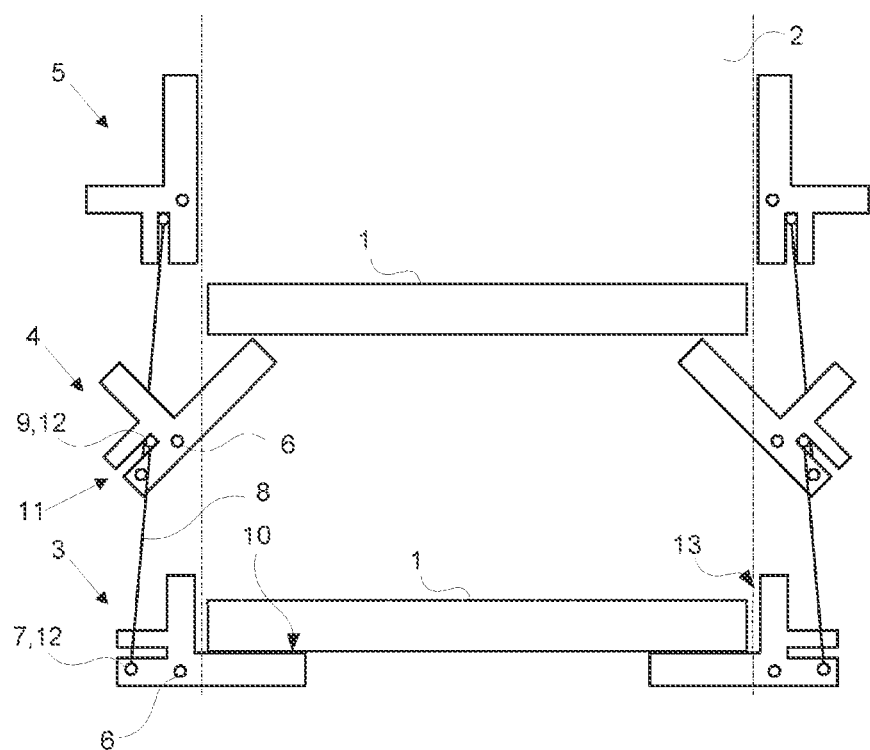

DEVICE FOR TRANSPORTING PIECE GOODS

REFERENCE TO PENDING PRIOR PATENT APPLICATIONS

This patent application is a 371 national stage entry of pending prior International (PCT) Patent Application No. PCT/DE2022/100596, filed 12 Aug. 2022 by FRENELL GmbH for DEVICE FOR TRANSPORTING PIECE GOODS, which patent application, in turn, claims benefit of German Patent Application No. 10 2021 122 268.0, filed 27 Aug. 2021.

The two (2) above-identified patent applications are hereby incorporated by reference.

FIELD OF THE INVENTION

The present invention relates to a device for transporting piece goods, in particular solar modules, comprising a trough-shaped transport frame consisting of a base and at least two boundary elements located opposite one another and enclosing a loading shaft between them, wherein a plurality of supports mounted to be facing one another are assigned to the boundary elements on both sides of the loading shaft, the supports being arranged above one another in a plurality of congruent planes and being each pivotable about an axis of rotation, wherein a first support engages a thrust point of a next higher second support via a thrust element rotatably fastened to a fastening point, and the axis of rotation of the first support being positioned between the fastening point of the thrust element and a support surface for supporting the piece goods.

BACKGROUND OF THE INVENTION

Such device is already known from DE 10 2016 103 997 B3. In this document, the piece goods are fitted by means of end plates with interlocking outer shapes at the ends, allowing the piece goods to be stacked and transported in a compact manner. In particular, what is concerned is the treatment of mirror units for solar fields, which are very sensitive as the mirror surfaces have to lie free and the exact curvature of the mirrors is applied to trapezoidal housing modules. Therefore, due to their sensitivity and their special shape, the mirror units cannot be stacked without additional modules. The solution of using puzzle-like end plates enables the trapezoidal mirror units to be stacked into one another in a space-saving manner and thus prevents more complex packaging.

However, what is problematic about this solution is the assembly and disassembly of said end plates, which are required for transportation purpose only and therefore finally need to be returned. Thus, a considerable amount of time and money is lost, especially since a lot of manual working is required to correctly interlock the end plates attached to the mirror units.

SUMMARY OF THE INVENTION

The task of the present invention therefore is to allow for the loading of piece goods, such as solar modules, without manual intervention, while ensuring that the mirror units can be stored at a distance from one another and without scratching the sensitive surfaces.

This task is solved by a device according to the features of independent claim 1. Useful embodiments may be inferred from the subsequent dependent claims.

The present invention relates to a device for transporting piece goods, in particular solar modules, comprising a trough-shaped transport frame consisting of a base and at least two boundary elements located opposite one another and enclosing a loading shaft between them, wherein a plurality of supports mounted to be facing one another are assigned to the boundary elements on both sides of the loading shaft, the supports being arranged above one another in a plurality of congruent planes and being each pivotable about an axis of rotation, wherein a first support engages a thrust point of a next higher second support via a thrust element rotatably fastened to a fastening point, and the axis of rotation of the first support being positioned between the fastening point of the thrust element and a support surface for supporting the piece goods.

Due to this construction, it is possible to use, for example, a forklift to lift the piece goods, including mirror units, into the transport unit one by one from outside without requiring preparation of each individual mirror unit. In fact, it is sufficient to lower them into the loading shaft from above, where the supports position themselves as follows. It is provided that the bottom level of the supports is in a receiving position in order to receive the first piece element. By loading these bottom supports, they are pressed down even further and are thus twisted around an axis of rotation. Further rotation causes the lower bottom layer of supports to push the layer of supports situated above into a receiving position via a thrust element. This allows the next one of the piece goods to be lowered through the loading shaft and to be placed on the newly provided supports. These in turn release the supports in the layer situated above and push them into their receiving position. In this manner, the entire loading shaft can be gradually filled. In the opposite direction, either the supports are pulled back into their initial position outside of the loading shaft due to pretension after the top layer of the piece elements has been removed, thus clearing the way for the piece goods, or they are pushed out of the way into their initial position by removing the layer underneath.

Thus, it is possible to place the piece goods in the transport frame, for example by using a forklift, without requiring preparation with transport aids and without securing the individual piece goods in the transport frame. Nevertheless, it is ensured that all of the piece goods are stored in such a manner that they are disposed to be separate, both upwards and downwards, from neighboring piece goods and without coming into contact with them.

According to an advantageous embodiment, the support is folded out of the loading shaft in a release position and can be pivoted via an intermediate position into a support position folded into the loading shaft, wherein in the release position, the clearance between the supports arranged facing one another is greater than the length of the piece goods, whereas in the support position, this clearance is less than the length of the piece goods.

Such construction makes it easy to lower the piece goods through the loading shaft into the lowest free layer, as the supports above are folded out of the loading shaft and therefore have a distance greater than the length of the piece goods. However, the lowest free layer is in the intermediate position, which allows reception by the supports and easy loading. The smaller distance between the supports in the intermediate position prevents the piece goods from falling deeper into the loading shaft. They are stopped by the supports and, due to their weight, push the supports into their final supporting position in which they fully protrude into the loading shaft.

As a further option, the subject-matter may be constructed such that the thrust element is slidingly mounted to the thrust point of the second support in such a way that a force transmission from the first support to the next higher second support starts in the intermediate position and displaces the next higher second support into its intermediate position until the first support is in the support position.

This alternative makes it easy to load the supports, as they are not only readily provided, but also accompany the piece goods a little bit further on their way to the support position via the intermediate position which allows the piece goods to be deposited more gently. A support loaded with one of the piece goods ensures that the next higher support is rotated so far that the next one of the piece goods comes to rest on it but is not rotated far enough to also cause the next but one support to already rotate into the loading shaft.

According to a further preferred embodiment, the thrust point of each support is designed to be a slide bearing. The subject-matter may also be constructed such that the slide bearing is designed to be a closed or semi-open slotted hole or slotted guide. This ensures that the transition is smooth and the thrust elements can be rigid, so that no additional complex configuration in the form of elastic thrust elements is required. A rigid connection without slide bearings would, however, result in all supports moving simultaneously, which is not desirable in terms of successive filling of the transport frame.

In addition, the thrust element can be formed in such a way that in the support position, it is under spring tension between two supports. This proves to be advantageous when removing the piece goods since, after the upper layer has been removed, the supports swing out of the loading shaft again when the next lower level is unloaded and the loading shaft has its maximum width again, so that the piece goods positioned at a lower level can move freely out of the loading shaft.

Moreover, according to an advantageous embodiment of the subject-matter, the thrust element is designed to be a push rod. Thus, a simple solution for the thrust element is obtained allowing direct force transmission from a lower-level support to the respective layer situated above.

Furthermore, the subject-matter may be constructed in such a way that the thrust elements engage in the supports with terminal angle elements. This embodiment ensures that the thrust elements are attached to the supports without interfering with each other. For example, they can be positioned to be offset in front of and behind the supports.

It is also possible for the thrust elements to be guided in a guide between the fastening point and the thrust point, with the guide preferably being connected to the transport frame. This ensures that the thrust elements remain aligned in their thrust direction and are restrained from moving away from the thrust point. This prevents accidental unthreading and bending. However, with such embodiment it must be ensured that the thrust elements remain tiltable and can utilize the degrees of freedom of the slide bearing.

According to a further embodiment, the supports are arranged in pairs within a plane, in particular directly opposite or offset to one another. This arrangement allows the piece goods to be stored in an even manner and the supports can be used economically, in particular in the case that the piece goods only have a small width.

In addition, the support surfaces of the supports can preferably be inclined in the support position. Especially in the case of piece goods that have a trapezoidal shape and are gripped from the sides, such as mirror units of solar modules, it is thus ensured that the support surfaces are adapted to the piece goods and that in such case a larger support surface is provided to the piece goods.

According to a further option, the support surfaces of the supports may be cushioned. This protects the piece goods from scratches and provides an additional buffering effect for transportation.

The device may also be designed such that each support has a side stop to improve the lateral stability of the piece goods. Herein, such stop may be formed in both directions in which lateral displacement may occur. If the supports are located in the area of a corner of the piece goods, an angle-shaped stop could also be used, which may prevent slipping in both directions simultaneously.

As an alternative, the supports of a lowest level may be designed such as to be pivotable only between the intermediate position and the support position. This prevents the lowest supports from having to be positioned before the first layer of the piece goods can be lowered into the loading shaft. Vice versa, regarding the lowest layer, it is not necessary to divert the supports from the loading shaft as the piece goods do not have to pass this layer.

Furthermore, it is proposed to supplement the device in such a way that a transport frame has several loading shafts. This allows several loads of piece goods to be placed in a common transport frame and to thus optimally use the loading space of vehicles. In particular, it is provided that, when transporting solar modules, for example two loading shafts are arranged next to one another and in each case two loading shafts one behind the other, which is advantageous for optimal utilization of the loading space of a transport truck.

In the following, the above invention is described in more detail by way of example.

BRIEF DESCRIPTION OF THE DRAWINGS

What is shown is
FIG. 1 a plurality of supports on both sides of a loading shaft in a schematic side view.

DETAILED DESCRIPTION OF THE PREFERRED EMBODIMENTS

FIG. 1 shows a schematic structure consisting of three levels of supports 3, 4 and 5, which are arranged in pairs on either side of a loading shaft 2. As a next step, a plurality of piece goods 1 are to be stored in the transport frame, not shown here, through the loading shaft 2, to which the supports 3, 4 and 5 are attached. Herein, first supports 3 are arranged at a lowest level, in which one of the piece goods 1, such as a solar module, is consequently stored first. Delivery thereof may for example be made using a forklift standing in front of or behind the drawing plane and facing it. Herein, one of the piece goods 1 is lowered into the loading shaft 2 from above, which is kept clear between the supports 3, 4 and 5, and can be guided past third supports 5. In a release position, the third supports 5 are pivoted such that their support surfaces 10 are held out of the loading shaft 2 and their surface normals point to the side. The first supports 3, on the other hand, are pivoted into the loading shaft 2 such that one of the piece goods 1 has come to rest on the support surfaces 10. As in this position the support surfaces 10 protrude into the loading shaft 2, the respective one of the piece goods 1 cannot be guided past them and takes up its support position on the first supports 3. In this support position, the respective one of the piece goods 1 is prevented from slipping in the direction of the first support 3 by a side stop 13 and is secured in its position in two dimensions. Further, by means of walls or doors of the transport frame or angular elements at the corners of the piece goods 1, slipping out of the drawing plane may be prevented.

On the side of an axis of rotation 6 facing away from the support surface 10, the supports 3, 4 and 5 are each assigned a fastening point 7, which is connected to a thrust point 9 of a second support 4 of the next higher level via a thrust element 8, for example a push rod with terminal angle elements 12. By lowering the support surface 10 of the first support 3, the fastening point 7 is pivoted around the axis of rotation 6 and thus, via the thrust element 8, pushes the thrust point 9 of the second support 4 upwards. This in turn causes the second support 4 to rotate about its axis of rotation 6 such that the support surface 10 of the second support 4 slightly protrudes into the loading shaft 2. However, the thrust element 8 is mounted in a slide bearing 11 on the side of the thrust point 9, so that the thrust element 8 can first be moved before it can exert pressure against the second support 4 at the thrust point 9. This ensures that the supports 3, 4 and 5 are not all caused to protrude into the loading shaft 2 at the same time, but that such protrusion can only occur as a result of being loaded with one of the piece goods 1.

If, as shown in FIG. 1, a second one of the piece goods 1 is lowered through the loading shaft 2, it will come into contact with the slightly flared support surfaces 10 of the second support 4 and its weight will move the latter from the intermediate position illustrated to a support position corresponding to that of the first support 3. The respective one of the piece goods 1 is then supported at a distance from the other one of the piece goods 1 already placed on the first support 3. As a result of the rotation from the intermediate position to the support position, a thrust element 8 situated between the second support 4 and the third support 5 exerts a thrust force such that the third support 5 is in turn pushed into the intermediate position. In the opposite direction, the respective one of the piece goods 1 lifted upwards via the loading shaft 2 can push the supports 4 and 5 aside and into the release position as required, thereby re-emptying the loading shaft 2.

Thus, a device is described above, which allows for the loading of piece goods, such as solar modules, without manual intervention, while ensuring that the mirror units can be stored at a distance from one another and without scratching the sensitive surfaces.

REFERENCE LIST

1 Piece goods
2 Loading shaft
3 First support
4 Second support
5 Third support
6 Axis of rotation
7 Fastening point
8 Thrust element
9 Thrust point
10 Support surface
11 Slide bearing
12 Angle element
13 Side abutment

The invention claimed is:

1. A device for transporting piece goods (1), comprising a trough-shaped transport frame consisting of a base and at least two boundary elements located opposite one another and enclosing a loading shaft (2) between them, wherein a plurality of supports (3, 4, 5) mounted to be facing one another are assigned to the boundary elements on both sides of the loading shaft (2), the supports (3, 4, 5) being arranged above one another in a plurality of congruent planes and being each pivotable about an axis of rotation (6), wherein a first support (3) engages a thrust point (9) of a next higher second support (4) via a thrust element (8) rotatably fastened to a fastening point (7), and the axis of rotation (6) of the first support (3) being positioned between the fastening point (7) of the thrust element (8) and a support surface (10) for supporting the piece goods (1), characterized in that the thrust element (8) is under spring tension between two supports (3, 4, 5) in a support position, wherein the thrust elements (8) engage in the supports (3, 4, 5) with terminal angle elements (12), the thrust elements (8) being guided between the fastening point (7) and the thrust point (9) in a guide, wherein the guide connected to the transport frame.

2. The device according to claim 1, characterized in that the support (3, 4, 5) is folded out of the loading shaft (2) in a release position and can be pivoted via an intermediate position into a support position folded into the loading shaft (2), wherein in the release position, the clearance between the supports (3, 4, 5) arranged facing one another is greater than the length of the piece goods (1), whereas in the support position, this clearance is less than the length of the piece goods (1).

3. The device according to claim 2, characterized in that the thrust element (8) is slidingly mounted to the thrust point (9) of the second support (4) in such a way that a force transmission from the first support (3) to the next higher second support (4) starts in the intermediate position and displaces the next higher second support (4) into its intermediate position until the first support (3) is in the support position.

4. The device according to claim 1, characterized in that the thrust point (9) of the supports (3, 4, 5) is respectively designed as a slide bearing (11).

5. The device according to claim 4, characterized in that the slide bearing (11) is designed as a closed or semi-open slotted hole or slotted guide.

6. The device according to claim 1, characterized in that the thrust element (8) is designed as a push rod.

7. The device according to claim 1, characterized in that the supports (3, 4, 5) are arranged in pairs within a plane, directly opposite or offset to one another.

8. The device according to claim 1, characterized in that in the support position, the support surfaces (10) of the supports (3, 4, 5) are inclined.

9. The device according to claim 1, characterized in that the support surfaces (10) of the supports (3, 4, 5) are cushioned.

10. The device according to claim 1, characterized in that the supports (3, 4, 5) each have a side abutment (13) for improving lateral stability of the piece goods (1).

11. The device according to claim 1, characterized in that the supports (3, 4, 5) of a bottom level are pivotable only between the intermediate position and the support position.

12. The device according to claim 1, characterized in that a transport frame has a plurality of loading shafts (2).

* * * * *